United States Patent
Zhang

(10) Patent No.: US 8,403,703 B2
(45) Date of Patent: Mar. 26, 2013

(54) ELECTRICAL CONNECTOR HAVING A HOUSING WITH DIFFERENT COLORS

(75) Inventor: Li-Zhi Zhang, Kunshan (CN)

(73) Assignee: Hon Hai Precision Ind. Co., Ltd., New Taipei (TW)

( * ) Notice: Subject to any disclaimer, the term of this patent is extended or adjusted under 35 U.S.C. 154(b) by 7 days.

(21) Appl. No.: 13/227,484

(22) Filed: Sep. 8, 2011

(65) Prior Publication Data

US 2012/0058686 A1 Mar. 8, 2012

(30) Foreign Application Priority Data

Sep. 8, 2010 (CN) .......................... 2010 2 0523413

(51) Int. Cl.
*H01R 13/58* (2006.01)

(52) U.S. Cl. ....................................... 439/606; 439/488

(58) Field of Classification Search .................. 439/604, 439/606, 488
See application file for complete search history.

(56) References Cited

U.S. PATENT DOCUMENTS

| | | | | |
|---|---|---|---|---|
| 6,443,759 B1 * | 9/2002 | Matsuda et al. | ............... | 439/488 |
| 6,551,127 B1 | 4/2003 | Li et al. | | |
| 6,601,296 B1 * | 8/2003 | Dailey et al. | ..................... | 29/848 |
| 6,837,746 B2 * | 1/2005 | Okamoto | ....................... | 439/606 |
| 6,843,685 B1 * | 1/2005 | Borgstrom et al. | ........... | 439/606 |
| 7,150,098 B2 * | 12/2006 | Borgstrom et al. | ............. | 29/874 |
| 7,287,885 B2 * | 10/2007 | Radu et al. | ..................... | 362/488 |
| 7,563,125 B2 * | 7/2009 | Pepe et al. | ..................... | 439/417 |

* cited by examiner

*Primary Examiner* — James Harvey
(74) *Attorney, Agent, or Firm* — Wei Te Chung; Ming Chieh Chang

(57) ABSTRACT

An electrical connector includes an insulative housing having a base portion defining a receiving cavity therein and a mating portion unitarily formed with the base portion and protruding outwardly from a front face of the base portion so as to define an insertion opening in communication with the receiving cavity. A plurality of terminals are received in the receiving cavity, each of which has a contacting portion extending rearwardly and upwardly from a position adjacent to the insertion opening. A rear cover is assembled on a rear section of the base portion and severs as a rear wall of the base portion. The insulative housing is formed by a double-colored-injection method and the mating portion and the base portion are configured as different colors. The double-colored-injection method can save an assembling process for the electrical connector, which is helpful for reducing the manufacturing cost.

20 Claims, 6 Drawing Sheets

ELECTRICAL CONNECTOR HAVING A HOUSING WITH DIFFERENT COLORS

BACKGROUND OF THE INVENTION

1. Field of the Invention

The present invention relates to an electrical connector, and more particularly to an electrical connector partly exposed to an exterior of an electronic apparatus in which the electrical connector is mounted.

2. Description of the Related Art

U.S. Pat. No. 6,551,127 issued to Li et al. on Apr. 22, 2003 discloses a socket connector includes an insulating housing, a plurality of terminals received in the housing, and a ring which has a color different from that of the housing. The housing has a mating portion at a front end thereof, and a sleeve projecting from the mating portion for insertion of a plug of a mating connector thereinto. An inner side of the ring has ribs formed thereon. The ribs securely engage with an outer surface of the sleeve. A pair of latches extend from the ring and engages with barbs formed by the mating portion of the housing and located in holes of the housing to secure the ring on the outer surface of the sleeve. However, as the insulating housing and the ring are two individual parts with different colors, and need to be molded by two different dies, which is not advantage for reducing the manufacturing cost. Obviously, an improved electrical connector is highly desired to overcome the aforementioned problem.

SUMMARY OF THE INVENTION

Accordingly, an object of the present invention is to provide an electrical connector for saving the manufacturing cost.

In order to achieve the object set forth, an electrical connector includes an insulative housing having a base portion defining a receiving cavity therein and a mating portion unitarily formed with the base portion and protruding outwardly from a front face of the base portion so as to define an insertion opening in communication with the receiving cavity. A plurality of terminals are received in the receiving cavity, each of which has a contacting portion extending rearwardly and upwardly from a position adjacent to the insertion opening. A rear cover is assembled on a rear section of the base portion and severs as a rear wall of the base portion. The insulative housing is formed by a double-colored-injection method and the mating portion and the base portion are configured as different colors.

Other objects, advantages and novel features of the invention will become more apparent from the following detailed description of the present embodiment when taken in conjunction with the accompanying drawings.

DETAILED DESCRIPTION OF THE INVENTION

Figure 1:
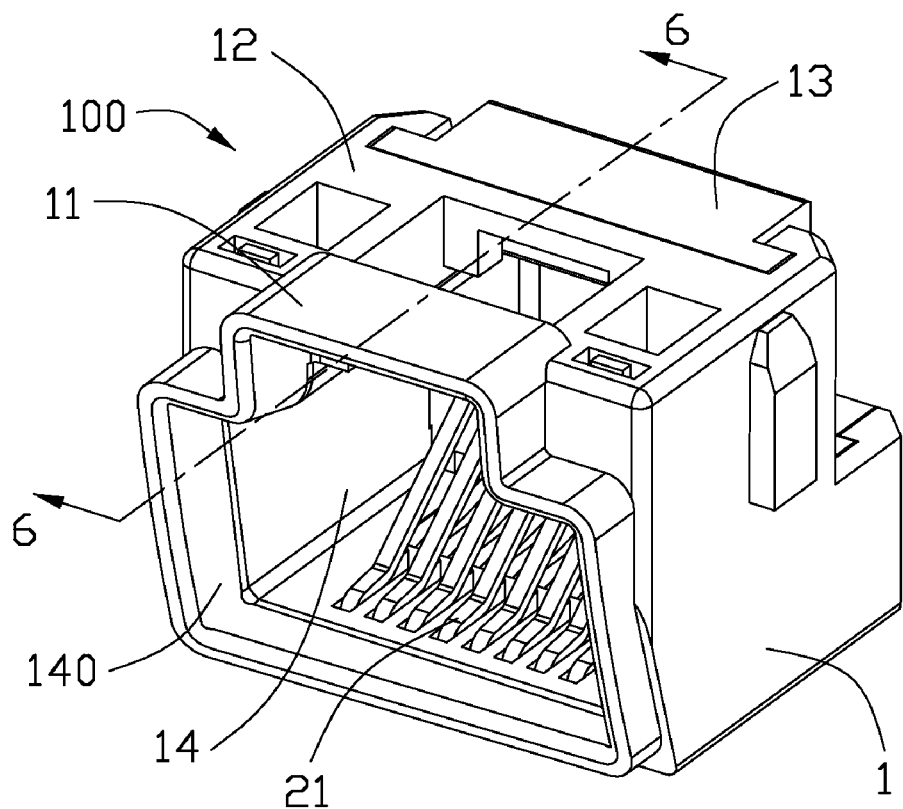
FIG. 1 is a perspective view of an electrical connector in accordance with the present invention.
Figure 2:
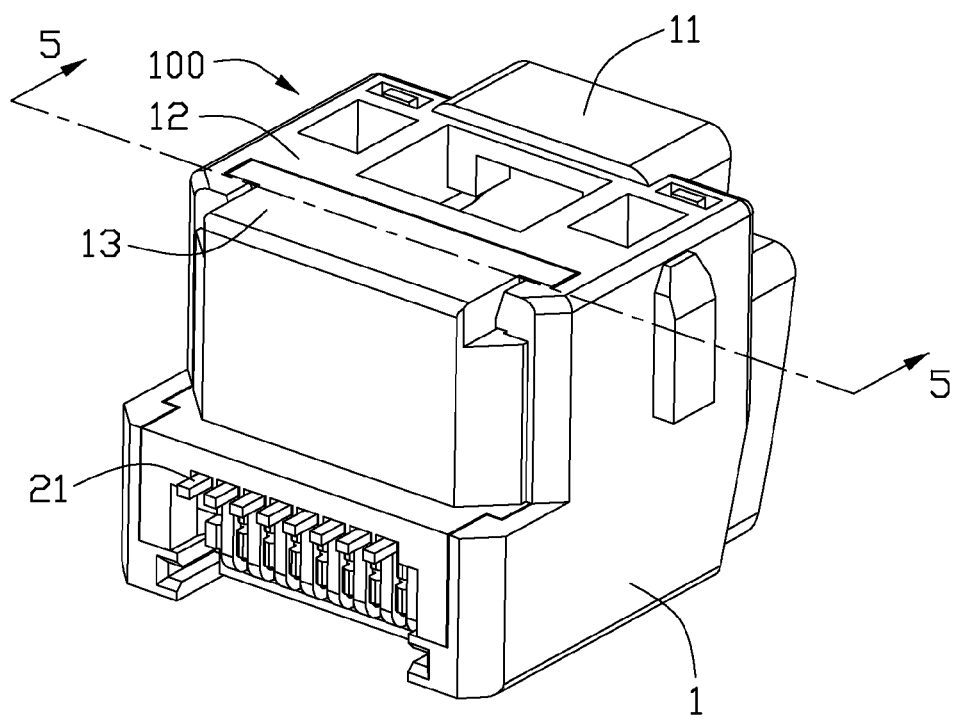
FIG. 2 is another perspective view of the electrical connector shown in FIG. 1.

Reference will now be made to the drawing figures to describe a preferred embodiment of the present invention in detail. Referring to FIG. 1 and FIG. 2, an electrical connector 100 made according to the preferred embodiment of the present invention is provided and comprises an insulative housing 1, a terminal module 2 received in the insulative housing 1 and a rear cover 13 assembled on a rear section of the insulative housing 1.

Figure 3:
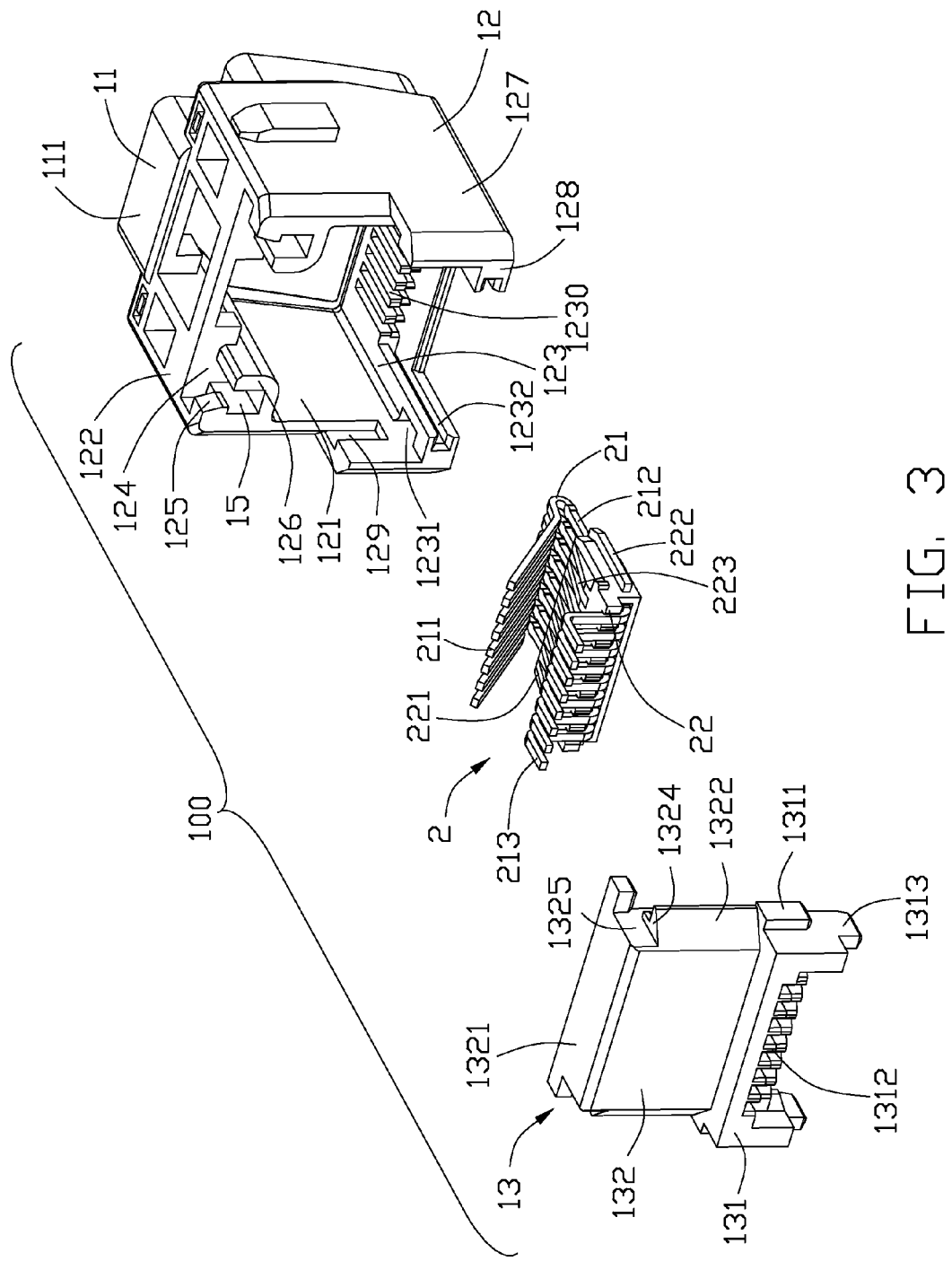
FIG. 3 is an exploded perspective view of the electrical connector shown in FIG. 1.
Figure 4:
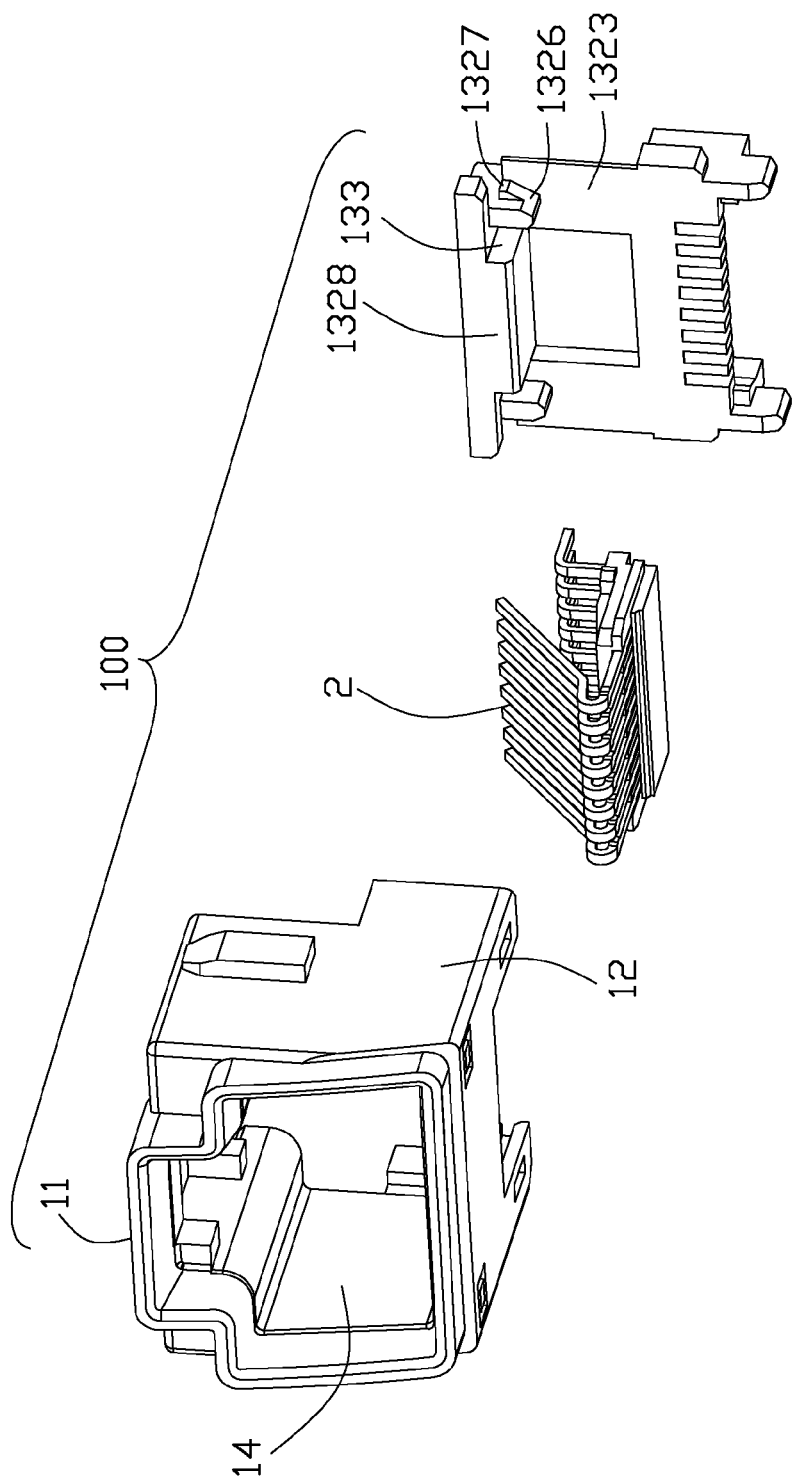
FIG. 4 is another exploded perspective view of the electrical connector shown in FIG. 1.

Referring to FIG. 3 and FIG. 4, the insulative housing 1 is in a rectangular shape and comprises a base portion 12 and a mating portion 11 unitarily formed with the base portion 12. The insulative housing 1 comprises a pair of side walls 121 parallel to each other and extending along a front-to-rear direction, and an upper wall 122 and a lower wall 123 connecting with the pair of side walls 121 thereby defining a receiving cavity 14 running therethrough along the front-to-rear direction. A plurality of terminal grooves 1230 staggered to each other are defined on the lower wall 123 for receiving terminals 21 retained in the terminal module 2. The mating portion 11 surrounds an exterior periphery of the receiving cavity 14 and protrudes outwardly from a front face of the base portion 12 so as to define a mating opening 140 therein. The mating portion 11 has an upper face 111 which is located at a higher level than the upper wall 122 of the base portion 12 in a vertical direction perpendicular to the front-to-rear direction. The upper face 111 inclines slantwise to join with the upper wall 122 of the base portion 12. The mating portion 11 and the base portion 12 are configured as two colors and integrally formed with each other by a double-colored-injection method, therefore when the electrical connector 100 is assembled into an electronic apparatus, with the mating portion 11 exposed to an exterior, the mating portion 11 can adjust its color to suit to the color of an electronic apparatus. Further, the double-colored-injection method can also save an assembling process, which is helpful for reducing the manufacturing cost.

Referring to FIG. 3, a pair of blocking arms 126 each of which is configured as an L shape, extend inwardly and upwardly from the side walls 121, with a holding space 15 defined between each blocking arm 126 and side wall 121. A pair of protrusions 125 spaced to the blocking arms 126 are formed above the holding space 15 and extend inwardly from an upper section of the side walls 121. Further, a pair of slots 124 are defined at a rear section of the upper wall 122 of the base portion 12 and located in front of the protrusions 125. The slots 124 extend downwardly and communicate with the holding space 15. A pair of wings 127 extend rearward from a rear lower section of the side walls 121, in each of which a vertical channel 129 is defined and extends along the vertical direction. Each wing 127 has an end surface 128 and a horizontal guiding slot 1232 extending along the front-to-rear direction. In addition, an aperture 1231 is defined under each vertical channel 129 and runs through the lower wall 123.

Figure 6:
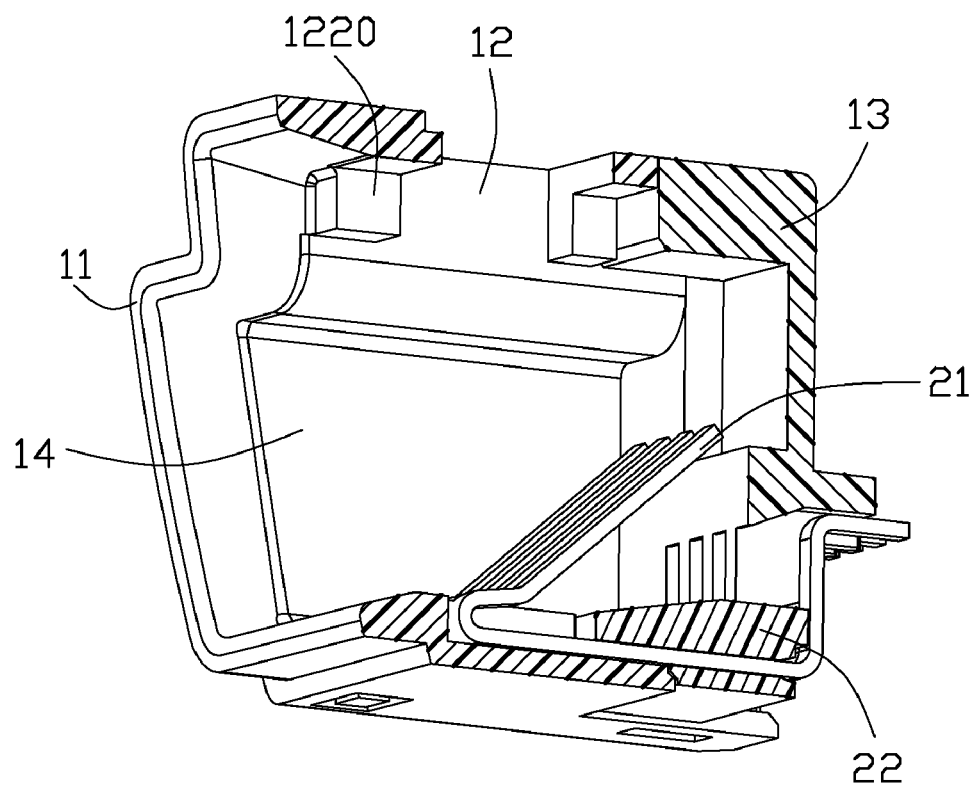
FIG. 6 is a cross-sectional view of the electrical connector shown in FIG. 1 along line 6-6.

During the modeling process, as dimension of the mating opening 140 is slightly smaller than that of the receiving cavity 14, a die which is used for the modeling process could not release from the base portion 12 from a front end thereof. To solve such a problem, the rear section of the base portion 12 is configured as a wide-opened configuration for permitting the die to release from the base portion 12. Then the rear cover 13 is assembled to the rear section of the base portion 12 and severs as a rear wall of the base portion 12. Referring to FIG. 6, for maintaining a mating plug within the receiving cavity 14, a pair of blocks 1220 are formed on an inner side of the upper wall 122 and located adjacent to opposite sides of the mating opening 140, therefore when the mating plug inserts into the receiving cavity 14 through the mating opening 140, the locking portions 1220 will engage with the mating plug for preventing the mating plug being drawn out by accident.

The rear cover 13 comprises a rectangular body portion 131 and a locking portion 132 extending upwardly from the body portion 131. The body portion 131 has a pair of rectangular blocks 1311 laterally protruding outwardly, a plurality of spaced terminal passageways 1312 at a middle portion of a bottom side of the body portion 131, and a pair of standing legs 1313 at opposite sides of the terminal passageways 1312 and extending downwardly. The locking portion 132 comprises a "T" shaped upper surface 1321, two slant side surfaces 1322 and a rear bottom surface 1323 connecting the two slant side surfaces 1322. Each slant side surface 1322 makes a break adjacent to the upper surface 1321 thereby forming a horizontal step surface 1324 and a vertical side surface 1325. A pair of hooks 1326 extend rearwardly from opposite sides of the rear bottom surface 1323, each with a tip 1327 protruding laterally. Further, a stuffer 1328 extends downwardly from the upper surface 1321 and located between the pair of hooks 1326 thereby defining a pair of recess portions 133 therebetween.

Referring to FIG. 3 and FIG. 4, the terminal module 2 comprises a plurality of terminals 21 and a retainer 22 insert-molded with the terminals 21. Each terminal 21 comprises a horizontal retaining portion 212, a contacting portion 211 slantwise extending rearward and upward from a front end of the retaining portion 212, and a solder leg 213 extending upward from a rear end of the retaining portion 212. The retainer 22 is in a flat profile and comprises a slant upper surface 221 and a pair of ribs 222 located at opposite sides of the retainer 22. A plurality of terminal slots 223 are defined on the upper surface 221 for receiving the contacting portions 211 of the terminals 21 when the contacting portions 211 are pressed downwardly by the mating plug.

Figure 5:
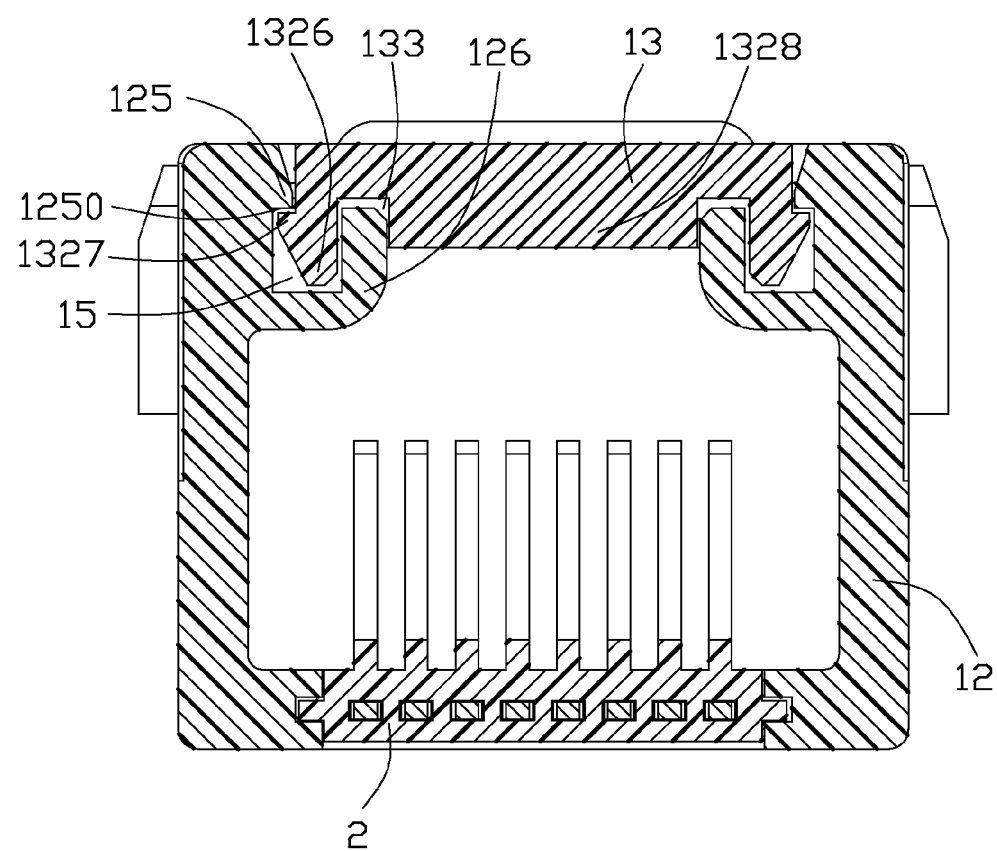
FIG. 5 is a cross-sectional view of the electrical connector shown in FIG. 2 along line 5-5.

Referring to FIG. 5, the terminal module 2 is inserted into the insulative housing 1 along the rear-to-front direction, with the pair of ribs 222 slideably received in the guiding slot 1232 and the terminals 21 received in the corresponding terminal grooves 1230. The rear cover 13 is assembled on the base portion 12 along the vertical direction, with the rectangular blocks 1311 and standing legs 1313 respectively received in the vertical channels 129 and apertures 1231, the hooks 1326 received in the holding space 15 with tips 1327 abutting against bottom faces 1250 of the protrusions 125. Meanwhile, the blocking arms 126 of the base portion 12 are received in the recess portions 133 of the rear cover 13 and the "T" shaped upper surface 1321 is suitably received in the slot 124. The solder legs 213 are received in the corresponding terminal passageways 1312 for better positioning the terminals 21.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical connector comprising:
   an insulative housing having a base portion defining a receiving cavity therein and a mating portion unitarily formed with the base portion and protruding outwardly from a front face of the base portion so as to define an insertion opening in communication with the receiving cavity;
   a plurality of terminals received in the receiving cavity, each of which has a contacting portion extending rearwardly and upwardly from a position adjacent to the insertion opening; and
   a rear cover, assembled on a rear section of the base portion and severing as a rear wall of the base portion;
   wherein the insulative housing is formed by a double-colored-injection method and the mating portion and the base portion are configured as different colors.

2. The electrical connector as described in claim 1, wherein the mating portion surrounds periphery of a front section of the receiving cavity.

3. The electrical connector as described in claim 2, wherein dimension of the insertion opening in a cross-sectional view is smaller than that of the receiving cavity therefore a die for modeling the insulative housing can not release from the receiving cavity from the insertion opening.

4. The electrical connector as described in claim 1, wherein a pair of blocks are formed on an inner side of the base portion and located adjacent to the insertion opening.

5. The electrical connector as described in claim 1, wherein the rear cover is inserted into receiving slots defined at rear section of the base portion.

6. The electrical connector as described in claim 5, wherein said terminals have soldering legs extending out of the base portion and received in corresponding terminal passageways defined at a bottom side of the rear cover.

7. An electrical connector for receiving a RJ plug comprising:
   an insulative housing formed by a double-colored-injection method and comprising a base portion defining a receiving cavity therein and extending along a rear-to-front direction for receiving said RJ plug, and a mating portion with a different color unitarily formed with the base portion and protruding outwardly from a front face of the base portion;
   a plurality of terminals received in the insulative housing, each of which has a contacting portion extending rearwardly and upwardly from a position adjacent to the mating portion; and
   a rear cover, assembled on a rear section of the base portion along a vertical direction perpendicular to the front-to-rear direction.

8. The electrical connector as described in claim 7, wherein the base portion defines an opening at a rear end thereof, from which a die for modeling the insulative housing could release.

9. The electrical connector as described in claim 8, wherein at least two holding spaces are defined at opposite sides of the opening for receiving a pair of hooks formed on the rear cover.

10. The electrical connector as described in claim 7, wherein the terminals are insert-molded with a retainer to form a terminal module, said terminal module is inserted into the insulative housing along the rear-to-from direction.

11. The electrical connector as described in claim 10, wherein the base portion has a bottom wall defining a recess therein and a pair of guiding slot at opposite sides of the recess, the retainer has a pair of ribs at opposite sides and slideably received in said guiding slot.

12. The electrical connector as described in claim 11, wherein said terminals have soldering legs extending out of the base portion and received in corresponding terminal passageways defined at a bottom side of the rear cover.

13. An electrical connector comprising:
a rear insulative body essentially composed of opposite top and bottom walls and opposite two side walls to commonly define a rear portion of a mating space;
a plurality of terminals disposed in the rear insulative body with contacting sections extending into the rear portion of the mating space; and
a front insulative body essentially composed of opposite upper and lower walls and opposite two lateral walls to commonly define a front portion of the mating space in alignment with the rear portion of the mating space; wherein
the rear insulative body and the front insulative body are integrally formed together via two shot injection molding under condition that the rear insulative body with a first melting point is made via a first shot of said two shot injection molding and the front insulative body with a second melting point lower than the first melting point, is made via a second shot of said two shot injection molding.

14. The electrical connector as claimed in claim 13, wherein an insulative rear cover attached to a rear face of the rear insulative cover to not only shield the mating space from an exterior but also regulate tails of the terminals which are exposed outside of the rear insulative body.

15. The electrical connector as claimed in claim 13, wherein an interface between the front insulative body and the rear insulative body is perpendicular to not only a front-to-back direction but also transverse directions perpendicular to said front-to-back direction.

16. The electrical connector as claimed in claim 13, wherein a cross-section of the front portion of the mating space is a little smaller than that of the rear portion of the mating space, so as to have the front insulative body form a flange structure to relative to the rear insulative body in the mating space.

17. The electrical connector as claimed in claim 13, wherein the rear insulative body defines a plurality of grooves to allow the contacting sections of the terminals to extend therethrough for entering the rear portion of the mating space.

18. The electrical connector as claimed in claim 13, wherein the rear insulative body and the front insulative body have different colors for either identification or decoration.

19. The electrical connector as claimed in claim 13, wherein said terminals are integrally formed with and upon a retainer via an insert molding procedure under condition that said retainer is assembled to the rear insulative body.

20. The electrical connector as claimed in claim 19, wherein an insulative rear cover attached to a rear face of the rear insulative cover to not only shield the mating space from an exterior but also regulate tails of the terminals which are exposed outside of the rear insulative body, and the retainer is assembled to the rear insulative body in a horizontal direction while the rear cover is assembled to the rear insulative body in a vertical direction perpendicular to said horizontal direction.

* * * * *